United States Patent [19]  [11] 4,452,308
Haskin et al.  [45] Jun. 5, 1984

[54] METHOD OF USING LOW MOLECULAR WEIGHT POLYALKYLENE GLYCOLS AS SACRIFICIAL AGENTS FOR SURFACTANT FLOODING

[75] Inventors: Helen K. Haskin, Houston; Phillip E. Figdore, Bellaire, both of Tex.

[73] Assignee: Texaco Inc., White Plains, N.Y.

[21] Appl. No.: 449,128

[22] Filed: Dec. 13, 1982

[51] Int. Cl.$^3$ ............................................. E21B 43/22
[52] U.S. Cl. .................................... 166/274; 166/275; 252/8.55 D
[58] Field of Search ............................... 166/273–275, 166/252, 270; 252/8.55 D

[56] References Cited

U.S. PATENT DOCUMENTS

| | | | |
|---|---|---|---|
| 3,414,054 | 12/1968 | Bernard | 166/9 |
| 3,469,630 | 9/1969 | Hurd et al. | 166/250 |
| 3,688,844 | 9/1972 | Roszelle | 166/274 |
| 3,692,113 | 9/1972 | Norton et al. | 166/275 |
| 3,804,173 | 4/1974 | Jennings | 166/274 X |
| 3,882,939 | 5/1975 | McAtee et al. | 166/274 |
| 3,946,811 | 3/1976 | Norton et al. | 166/274 |
| 4,005,749 | 1/1977 | Birk et al. | 166/273 |
| 4,133,385 | 1/1979 | Kalfoglou | 166/273 |
| 4,142,582 | 3/1979 | Kalfoglou | 166/273 |
| 4,172,497 | 10/1979 | Kalfoglou | 166/273 |
| 4,217,958 | 8/1980 | Doster et al. | 166/275 X |
| 4,295,980 | 10/1981 | Motz | 166/274 X |
| 4,360,061 | 11/1982 | Canter et al. | 166/274 |

*Primary Examiner*—Stephen J. Novosad
*Attorney, Agent, or Firm*—Robert A. Kulason; Jack H. Park; Harold J. Delhommer

[57] ABSTRACT

The disclosed invention is a method of injecting polyalkylene glycols, or copolymers thereof, having a molecular weight between about 100 and 1200 into a hydrocarbon formation in conjunction with a chemical flooding process to reduce the loss of injected chemicals to the formation by adsorption and precipitation.

9 Claims, No Drawings

METHOD OF USING LOW MOLECULAR WEIGHT POLYALKYLENE GLYCOLS AS SACRIFICIAL AGENTS FOR SURFACTANT FLOODING

FIELD OF THE INVENTION

This invention relates to a method of injecting chemicals into a petroleum reservoir for the purpose of increasing petroleum recovery. More particularly, the invention pertains to the use of low molecular weight polyalkylene glycols as sacrificial agents to decrease adsorption and precipitation of surfactants within petroleum reservoirs.

BACKGROUND OF THE INVENTION

One of the most vexing problems in the use of surfactant flooding for enhanced oil recovery is the frequent substantial loss of surfactant due to adsorption on the formation matrix and precipitation by polyvalent cations such as calcium and magnesium. Surfactant adsorption on the formation matrix significantly decreases surfactant flood efficiency, and because it is necessary to inject a greater quantity of surfactant, increases the cost of any surfactant flood.

Additionally, most surfactants are satisfactory for surfactant flooding only if the calcium and magnesium concentrations of the formation water fall below about 500 ppm. Petroleum sulfonates, the most popular type of surfactants, precipitate where divalent ion concentrations exceed about 500 ppm. Such precipitation renders the sulfonates inoperative for recovering oil and in some instances, causes formation plugging.

Many subterranean petroleum-containing formations are known to exist which contain polyvalent ions such as magnesium and calcium in concentrations far in excess of 500 ppm. The most common of these reservoirs are limestone formations which may have polyvalent ion concentrations from 200 to 20,000 ppm in the original connate water. Similar polyvalent ion concentrations can also be found in sandstone reservoirs containing kaolinite and bentonite clays, which also provide additional problems in adsorption of surfactant.

Where high divalent ion concentrations exist, most petroleum sulfonates cannot be used because the high surfactant losses due to precipitation and adsorption on the matrix render use uneconomical. In such an environment, the flood water will lack the surfactant necessary to substantially decrease the interfacial tension between water and petroleum. Furthermore, precipitated petroleum sulfonate often plugs small flow channels in subterranean hydrocarbon formations. Such plugging from precipitated surfactants decreases formation porosity and injectivity, causing substantial decreases in oil displacement efficiency.

Nonionic surfactants, such as polyethoxylated alkyl phenols, polyethoxylated aliphatic alcohols, carboxylic esters, carboxylic amides and polyoxyethylene fatty acid amides have a somewhat higher tolerance of polyvalent ions than do the more commonly utilized anionic surfactants which generally have water soluble sulfonate, sulfate, phosphate or carboxylate groups. However, while it is technically feasible to employ a nonionic surfactant solution to decrease interfacial tension between the injected aqueous displacing medium and the petroleum contained in hydrocarbon formations, these surfactants are frequently not economically feasible for several reasons. First, nonionic surfactants are also subject to adsorption on the formation matrix, which can drastically decrease the amount of surfactant available for lowering interfacial tension. Second, nonionic surfactants are not as effective on a per unit basis as are the more commonly used anionic surfactants. Third, nonionic surfactants have a higher cost per unit weight than do anionic surfactants. Furthermore, nonionic surfactants are ineffective at formation temperatures above their cloud points.

Various chemicals have been employed as sacrificial agents to pretreat formations to decrease the adsorption of subsequently injected surfactants or to tie up polyvalent cations and prevent them from precipitating surfactants from the flood medium. Some examples include the use of aqueous solutions of pyridine as disclosed in U.S. Pat. No. 3,414,054, the use of sodium carbonate and inorganic polyphosphates as disclosed in U.S. Pat. No. 3,469,630, the use of metal phosphates as disclosed in U.S. Pat. No. 3,688,844 and the use of modified lignosulfonates as described in U.S. Pat. Nos. 4,133,385; 4,142,582 and 4,172,497.

U.S. Pat. No. 3,692,113 discloses the injection of a polyalkylene glycol of high molecular weight, probably greater than one million to further increase the viscosity of the flooding medium to prevent channel formation within the reservoir. The polyalkylene glycol is preferably injected with alkaline earth materials. U.S. Pat. No. 3,882,939 also discloses the injection of a polyalkylene glycol to increase viscosity of the flooding solution, but with a molecular weight of from 10,000 to 10,000,000, preferably from 1 to 6 million. The polyalkylene glycol was injected in conjunction with a biopolymer in '939 to achieve better mobility control.

U.S. Pat. Nos. 3,946,811 and 4,005,749 disclose the use of polyalkylene glycols as sacrificial agents with surfactant and polymer floods to reduce surfactant loss to divalent ion precipitation and adsorption within the formation. In U.S. Pat. No. 3,946,811 it is stated that the polyethylene glycol should have a molecular weight of from 10,000 to 100,000,000, most preferably 100,000 to 600,000. A molecular weight greater than 1,200 is stated to be required for the practice of U.S. Pat. No. 4,005,749. The reference examples consider and reject the use of a polyalkylene glycol with a lower molecular weight.

SUMMARY OF THE INVENTION

The disclosed invention is a method of injecting polyalkylene glycols, or copolymers thereof, having a molecular weight less than about 1200 and greater than about 100 into a hydrocarbon formation in conjunction with a chemical flooding process to reduce the loss of injected surfactant to the formation by adsorption and precipitation. These sacrificial agents which are preferably polyethylene glycol and polypropylene glycol may be injected either in a preflush solution prior to the injection of surfactant or in solution with injected chemicals such as surfactants, solubilizers, sulfonates and viscosity enhancers. The sacrificial agents are preferably injected in a concentration of about 0.01% to about 5.0% by weight polyalkylene glycol.

DETAILED DESCRIPTION

In carrying out this invention, a solution containing polyalkylene glycols with a molecular weight less than about 1200 and greater than about 100 is injected as a sacrificial material through an injection means comprising one or more injection wells into a hydrocarbon formation. The sacrificial material is injected in a manner to substantially occupy or cover all potential adsorption sites of the rock within the hydrocarbon formation, thereby reducing the extent of injected surfactant adsorption. The phrase "adsorption sites of the formation rock" is used to mean those portions of the formation rock surface, including matrix pores, which are capable of adsorbing a chemical compound from a solution on contact.

The preferred sacrifical agents of the present invention are polyethylene glycol and polypropylene glycol having molecular weights between about 100 and about 1200. A copolymer of polyethylene glycol and polypropylene glycol may also be used, but is less preferred. All of these agents have very similar sacrificial agent properties in this molecular weight range.

It is most desirable that a sacrificial material be less expensive than the surfactant employed and be readily adsorbed by the rock in the hydrocarbon formation. The presence of the adsorbed sacrificial material should also retard or eliminate the subsequent adsorption of surfactant on the adsorption sites of the formation rock. A lack of sacrificial agent interaction with other injected chemicals is also advantageous. Such guidelines are, however, flexible. It is possible that a sacrificial agent may be a highly desirable material to use even though it may cost considerably more than a surfactant, if it can be used in substantially smaller concentrations than the surfactant.

The highly undesirable loss of surfactant in chemical flooding may generally be attributed to two phenomena. The first phenomenon is chemical removal or inactivation of the surfactant after contact with polyvalent cations or other materials dissolved in the formation fluids. The second phenomenon is adsorption within the formation due to physical contact of the surfactant with the formation matrix. It is believed that both phenomena exist simultaneously to varying degrees in most chemical flooding operations.

It is believed that sacrificial agents generally work by one or more of several chemical mechanisms. However, it must be emphasized that these chemical mechanisms are theoretical and the extent to which any one of these mechanisms may be responsible for the effectiveness of a sacrificial agent is not known. One possible chemical mechanism is the complexing of the sacrificial agent with polyvalent cations in solution, both by neutral and by charged sacrificial complexing agents. To the extent that the sacrificial agent complexes with the polyvalent cations in solution, there will be less polyvalent cations left for the surfactant to interact with.

A second possible mechanism is the electrostatic attraction of the matrix and the sacrificial agent for each other. This is predominantly controlled by the surface charge of the matrix which is mainly determined by the pH of the formation water or by other potential determining ions. The formation brine is a secondary controlling factor since it can screen some of the surface charge from the surfactant, allowing it to approach the surface more closely and thus more readily absorb. This is known as a double layer effect.

A third type of mechanism is believed to be hydrogen bonding of polar and organic sacrificial materials to uncharged portions of a clay matrix. A fourth possible mechanism arises from the fact that polymers have many functional groups and may attach themselves to the rock surface in many places, thereby blocking the sites on which injected chemicals could absorb. In this manner, the large size of polymer molecules may block entrances to very small pores where much of the surface area and adsorption sites lie. Furthermore, the character of the formation matrix, be it carbonate, bentonite, kaolinite or something between these three disparate types of substrates also has a significant impact upon the effectiveness of the sacrificial material. The surfactant itself that is employed also alters adsorption, but it is generally not as critical as the type of formation matrix.

The polyalkylene glycol sacrificial agents of the present invention are effective in reducing the adsorption of any type of surfactant used for enhanced oil recovery on many substrates under a wide range of brine and temperature conditions. This contrasts to the cited references in which the substrates used are usually limited to Berea sandstone at a given temperature and a given brine. The sacrificial material should be injected into the subterranean formation either in a slug preceding the injected chemicals or in solution along with the surfactant, solubilizer or viscosity enhancing chemicals. The use of the sacrificial material of the invention substantially decreases surfactant loss, thereby allowing the surfactant to achieve the desired lower interfacial tension, which increases oil recovery.

Both the sacrificial material and the surfactant may be injected into the subterranean hydrocarbon formation in an aqueous solution or in a non-aqueous solution with a hydrocarbon solvent, depending upon other requirements. However, economic considerations usually require that the materials be injected in aqueous solutions whenever possible.

The quantity of sacrificial polyalkylene glycol to be injected should be sufficient to occupy substantially all of the active adsorption sites of the formation matrix, in order to effect the maximum reduction in the amount of surfactant loss to the formation. If less than this optimum amount is used, which will, of course, vary from formation to formation, the corresponding reduction in surfactant loss to the formation will not be as great as in the case where the formation adsorption sites were completely saturated. Similarly, if more than the amount of polyalkylene glycol necessary to occupy all of the active adsorptions sites and polyvalent cations is injected into the hydrocarbon formation, no additional reduction in oil displacement efficiency will result. However, the use of excess sacrificial materials will substantially increase the cost of the chemical flooding. The preferred total amount of sacrificial polyalkylene glycol injected will vary with the composition of the formation, the thickness of the formation, the pattern area to be swept and various other formation characteristics.

The concentration of polyalkylene glycol injected does not appear to be critical, since it is the total amount of sacrificial material injected that normally determines the effectiveness in preventing surfactant loss. It is preferred that the polyalkylene glycol be injected in a solution with a concentration ranging from about 0.01% to about 0.5% by weight. It is further preferred that about 0.005 to about 0.4 pore volumes of sacrificial material solution should be injected into the formation, as required to match the chemical slug size.

Since the adsorptivity of reservoirs varies considerably depending on the type of formation encountered and the polyvalent ion complexing substantially depends upon the concentration of cations present, considerable knowledge of the formation is necessary in order to determine the optimum amount of polyalkylene glycol to be injected in order to achieve the maximum reduction in surfactant loss. If the hydrocarbon formation is a relatively clean sandstone lacking substantial clay content, significantly smaller quantities of sacrificial agent will be needed than in the case where the formation contains large amounts of highly adsorbant clays such as bentonite.

The effectiveness of using polyalkylene glycol or copolymers thereof for reducing surfactant and solubilizer loss in chemical flooding operations is demonstrated by the following examples. These examples are presented for illustrative purposes and should not be construed to limit the scope of the invention, which is defined in the claims which follow.

EXAMPLES

The surfactant loss from a stock petroleum sulfonate/solubilizer system was measured under varying conditions both with and without the test sacrificial agent. All agents were tested in two different brines at 43° C. and 74° C. with three different substrates: bentonite, kaolinite and calcium carbonate. Brine #1 was a soft brine with a total dissolved solid (TDS) content of about 96,500 ppm and a divalent ion concentration of 548 ppm. Brine #2 had a total dissolved solids content of 94,340 ppm and a divalent ion concentration of 9,190 ppm. All solutions were tested to determine the actual petroleum sulfonate concentration present prior to the beginning of testing. The percent change in surfactant loss for each agent is listed in Table I.

The brines employed in the examples contained the following materials:

|  | Brine #1 | Brine #2 |
|---|---|---|
| Ca | 425 ppm | 7120 ppm |
| Mg | 123 | 2066 |
| Na | 37,225 | 25,863 |
| $HCO_3$ | 512 | 708 |
| $SO_4$ | 0 | 1763 |
| Cl | 58,217 | 56,815 |
| TDS | 96,502 | 94,335 |
| Ionic Strength | 3.3 | 3.3 |

The petroleum sulfonate/solubilizer stock was prepared as a 2.6% solution containing 0.53% of a petroleum sulfonate sold under the trademark of Witco TRS-18 by Witco Chemical Co., 1.23% of a petroleum sulfonate sold under the trademark Witco TRS-40 by Witco Chemical Co. and 0.8% of an ethoxylated anionic surfactant sold under the trademark N-60CS by Texaco Chemical Co.

The sacrificial agents tested were polyethylene glycol having molecular weights of 300, 600, 1540, 6000, 100,000 and 1,000,000. Ethylene glycol was also tested. Lignosite 458 and Uni-Cal Domestic are two commercially available trademarked lignosulfonates sold by Georgia Pacific Inc. and Union Oil of California, respectively. The lignosulfonates were tested for comparative purposes only.

All tests run with bentonite clay substrates were conducted with 40 ml of petroleum sulfonate/solubilizer stock with and without the sacrificial agent to be tested and 2 grams of bentonite. The other substrates were tested similarly: for kaolinite, 10 grams of substrate and 40 ml of petroleum sulfonate/solubilizer were used; for calcium carbonate, 20 grams of substrate and 50 ml of petroleum sulfonate/solubilizer were used.

Dry substrate chosen from the group of bentonite clay, kaolinite clay and calcium carbonate was weighed into bottles and the petroleum sulfonate/solubilizer and sacrificial agent mixtures were added by pipet. The bottles were tightly capped and then gently agitated in a preheated oven at 43° C. or 74° C. After 24 hours, the bottles were removed and centrifuged before the liquid was decanted for analysis.

A 2-phase titration was employed to determine the concentration of petroleum sulfonates and solubilizers present in the liquid. The difference between the petroleum sulfonate/solubilizer concentration after testing and the original concentration reflects the loss of petroleum sulfonate/solubilizer to the substrate and brine environment. Surfactant losses with and without the test sacrificial agent were compared to yield the percentage changes in surfactant loss shown in Table I. By use of the different substrates and the varying divalent ion concentrations, surfactant loss due to adsorption and precipitation was measured.

An examination of Table I indicates that the polyethylene glycol agents worked very well in mitigating surfactant and solubilizer loss in a bentonite environment, but not in kaolinite or calcium carbonate. In fact, the polyethylene glycols worked two to four times better in reducing surfactant loss in a bentonite environment than the commercially available lignosulfonates. Thus, in reservoirs with a high percentage of swelling clays, the polyalkylene glycol agents of the present invention would be the sacrificial agents of choice.

It should be noted that the sacrificial agent effects fall off considerably with increasing molecular weight. Ethylene glycol, at the other end of the molecular weight scale, failed to effectively reduce surfactant adsorption. Because one may encounter widely varying formation characteristics which alter the efficiency of sacrificial agents, it is preferred to use an polyalkylene glycol with a molecular weight between about 100 and 1200 when injecting into an underground formation.

Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

TABLE I

| | PERCENT CHANGE IN SURFACTANT LOSS[a] | | | | | | |
|---|---|---|---|---|---|---|---|
| | | Brine #1[c] | | | Brine #2[d] | | |
| | | Bentonite | Kaolinite | $CaCO_3$ | Bentonite | Kaolinite | $CaCO_3$ |
| Tested at 43° C. | | | | | | | |
| Ethylene Glycol | (2.5%) | 0 | | | 0 | | |
| Polyethylene Glycol 300 | (2.5%) | −100 | | | −100 | | |
| Polyethylene Glycol 600 | (2.5%) | −100 | +75 | 0 | −100 | +10 | 0 |
| Polyethylene Glycol 1540 | (2.5%) | −90 | | | −95 | | |
| Polyethylene Glycol 6000 | (2.5%) | −20 | | | −35 | | |

TABLE I-continued

| PERCENT CHANGE IN SURFACTANT LOSS[a] | | | | | | | |
|---|---|---|---|---|---|---|---|
| | | Brine #1[c] | | | Brine #2[d] | | |
| | | Bentonite | Kaolinite | $CaCO_3$ | Bentonite | Kaolinite | $CaCO_3$ |
| Polyethylene Glycol 100,000 | (2.5%) | 0 | 0 | −20 | −15 | 0 | 0 |
| Polyethylene Glycol 1,000,000 | (2.5%) | 0 | +10 | +15 | 0 | +25 | −15 |
| Lignosite 458 | (2.5%) | −35 | 0 | −50 | −40 | +40 | −20 |
| Uni-Cal Domestic | (2.5%) | −30 | +30 | −85 | −25 | +15 | −25 |
| Tested at 74° C. | | | | | | | |
| Ethylene Glycol | (2.5%) | 0 | | | 0 | | |
| Polyethylene Glycol 300 | (2.5%) | −100 | | | −100 | | |
| Polyethylene Glycol 600 | (2.5%) | −95 | +55 | −10 | −95 | 0 | +20 |
| Polyethylene Glycol 1540 | (2.5%) | −100 | | | −95 | | |
| Polyethylene Glycol 6000 | (2.5%) | −25 | | | −20 | | |
| Polyethylene Glycol 100,000 | (2.5%) | −15 | 0 | −10 | −10 | 0 | 0 |
| Polyethylene Glycol 1,000,000 | (2.5%) | +15 | 0 | +10 | −20 | +110 | 0 |
| Lignosite 458 | (2.5%) | −60 | 0 | −40 | −30 | +25 | −40 |
| Uni-Cal Domestic | (2.5%) | −20 | −25 | −65 | −15 | −10 | −55 |

[a]To nearest 5%, less than 10% reported as zero.
[b]Sacrificial agent concentration in parentheses as weight percent.
[c]Total dissolved solids = 96,500 ppm, $Ca^{+2} + Mg^{+2}$ = 548 ppm.
[d]Total dissolved solids = 94,340 ppm, $Ca^{+2} + Mg^{+2}$ = 9190 ppm.

What is claimed is:

1. A method of recovering petroleum from a subterranean hydrocarbon formation which is penetrated by at least one injection well and at least one production well wherein chemicals are injected into the formation to sweep oil through the formation, which comprises:
   injecting into the formation a solution containing about 0.01% to about 5.0% by weight of a sacrificial agent designed to prevent the loss to the formation of said injected chemicals,
   said sacrificial agent selected from the group consisting of polyalkylene glycols and copolymers thereof having a molecular weight between about 100 and 1200.

2. The oil recovery method of claim 1 wherein said injected chemicals are selected from the group consisting of surfactants, solubilizers and sulfonates.

3. The oil recovery method of claim 1, wherein the sacrificial agent is injected into the formation in solution with said injected chemicals.

4. The oil recovery method of claim 1, wherein the sacrificial agent is injected into the formation prior to the injection of said injected chemicals.

5. The oil recovery method of claim 1, wherein the sacrificial agent is polyethylene glycol.

6. The oil recovery method of claim 1, wherein the sacrificial agent is polypropylene glycol.

7. The oil recovery method of claim 1, wherein the sacrificial agent is a copolymer of polyethylene glycol and polypropylene glycol.

8. The oil recovery method of claim 1, wherein the sacrificial agent is a mixture of polyethylene glycol and polypropylene glycol.

9. The oil recovery method of claim 1, wherein about 0.005 to about 0.4 pore volumes of sacrificial agent is injected into the formation.

* * * * *